United States Patent
Cherubini et al.

(10) Patent No.: US 8,144,414 B2
(45) Date of Patent: Mar. 27, 2012

(54) DATA INTERLEAVING IN TAPE DRIVES

(75) Inventors: Giovanni Cherubini, Rueschlikon (CH); Roy Daron Cideciyan, Rueschlikon (CH); Evangelos S Eleftheriou, Rueschlikon (CH); Thomas Mittelholzer, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 76 days.

(21) Appl. No.: 12/720,711

(22) Filed: Mar. 10, 2010

(65) Prior Publication Data
US 2010/0232047 A1    Sep. 16, 2010

(30) Foreign Application Priority Data

Mar. 11, 2009  (EP) .................................. 09154918

(51) Int. Cl.
*G11B 5/09* (2006.01)
*H03M 13/03* (2006.01)

(52) U.S. Cl. .............................. 360/48; 360/53; 714/792
(58) Field of Classification Search .................... None
See application file for complete search history.

(56) References Cited

U.S. PATENT DOCUMENTS

| 6,282,039 | B1 | 8/2001 | Bartlett |
| 6,347,390 | B1 * | 2/2002 | Ino .................................. 714/792 |
| 7,127,554 | B2 | 10/2006 | Buckingham |

OTHER PUBLICATIONS

U.S. Appl. No. 12/351,738, Cideciyan, et al.
U.S. Appl. No. 12/351,747, Cideciyan, et al.
U.S. Appl. No. 12/353,106, Bui, et al.

* cited by examiner

*Primary Examiner* — Daniell L Negron
*Assistant Examiner* — Regina N Holder
(74) *Attorney, Agent, or Firm* — Vazken Alexanian (57) ABSTRACT

Methods and apparatus for interleaving data in a multitrack tape drive and for writing data on a multitrack tape in the tape drive. One method includes: partitioning the data into $m(2^n+k)$ data blocks, where each data block has a logical array of rows and columns of data bytes; error-correction coding a row and a column of the logical array to produce an encoded block; assigning the coded row to a respective location in a logical interleave array having L rows and $2^n+k$ columns of locations; and writing a sequence of assigned coded rows simultaneously in respective data tracks on the multitrack tape. The coded row is assigned such that the minimum Euclidean distance on the multitrack tape between the coded rows is maximized. The apparatus includes units for performing the methods and the computer program product includes a program code means for causing a computer to perform the methods.

15 Claims, 5 Drawing Sheets

DATA INTERLEAVING IN TAPE DRIVES

CROSS-REFERENCE TO RELATED APPLICATIONS

This application claims priority under 35 U.S.C. §119 to European Patent Application No. 09154918.8 filed Mar. 11, 2009, the entire contents of which are incorporated by reference herein.

BACKGROUND OF THE INVENTION

1. Field of the Invention

The present invention relates generally to interleaving data in tape drives. In particular, the present invention provides methods and apparatus for writing interleaving data to a multitrack tape, data-write methods and tape drives incorporating such interleaving systems.

2. Description of the Related Art

In multitrack tape drives, a plurality of write elements are provided on the write-head for writing data simultaneously in respective parallel data tracks extending longitudinally within the tape. In LTO (linear tape open) drives for example, multiple data tracks are arranged in several data bands spaced laterally across the ½-inch (1.27 cm) magnetic tape. The LTO standard is detailed in Standard ECMA-319, "Data interchange on 12.7 mm 384-track magnetic tape cartridges—Ultrium-1 format", June 2001. For each data band on the tape, the read/write head can be positioned in a plurality of lateral positions based on the positional information derived from servo patterns recorded on the tape. The servo patterns are recorded in servo bands located on either side of a data band, and are read by dedicated servo sensors on the head. The TBS (timing-based servo) format is used in LTO drives. The TBS servo pattern has a frame format where magnetic transitions define a series of stripes with two different azimuthal slopes.

During read/write operations, the transversal position of the head can be derived from the relative timing of pulses generated by a narrow servo sensor that reads the stripe pattern. A plurality of servo locations are defined, where each servo corresponds to a different lateral position across the servo pattern, and hence resulting in a different relative pulse-timing. Each servo location corresponds to a different lateral position of the multi-element write head across the data band. In each of these lateral positions, the head can simultaneously write to a different subset of the tracks in the data band. TBS patterns also allow the encoding of longitudinal position information by shifting transitions (stripes) in the servo pattern from their nominal pattern position in the longitudinal direction of the tape.

In LTO drives, the read/write head can simultaneously write to $2^n$ data tracks using $2^n$ write elements as described above. The required reliability of data read from the tape is very high, e.g., on the order of one erroneous byte in $10^{17}$ read bytes. The LTO recording channel employs an error-correction (EC) coding technique based on a two-dimensional RS (Reed-Solomon) product code. Shortly after various preliminary processing stages, a stream of input data symbols is partitioned into successive "data sets". Each data set is further partitioned into $m*2^n$ data blocks, known as "sub data sets", where m and n are positive integers and * denotes multiplication herein. Each sub data set has a logical array of $K_2$ rows and $K_1$ columns of data bytes. EC coding is then performed over each row and column of the sub data set using a two-dimensional RS product code, where $(N_1-K_1)$ check bytes are added at the end of each row and $(N_2-K_2)$ check bytes are added at the end of each column. The resulting encoded sub data set has $N_2$ rows and $N_1$ columns of data bytes. The rows and the columns of the encoded sub data sets are referred to as C1 codewords and C2 codewords respectively.

After various further processing stages, the C1 codewords of the $m*2^n$ sub data sets are supplied to the $2^n$ write elements on the read/write head that write simultaneously to $2^n$ data tracks. The assignment of codewords to particular tracks, and the ordering of codewords in each track, is determined by an interleaving table defining a logical array of rows and columns of locations. This interleaving table has $2^n$ columns, one for each of the $2^n$ simultaneously-written data tracks. C1 codewords from the $m*2^n$ sub data sets are effectively assigned to respective locations in the interleaving table. The sequence of codewords in each column of the interleaving table is then supplied (after various additional processing stages) to a different one of the $2^n$ write elements and written in the associated data track.

Examples of interleaving systems for use in LTO drives are described in co-pending U.S. patent application Ser. No. 12/351,738, filed Jan. 9, 2009, and Ser. No. 12/351,747, filed Jan. 9, 2009. These systems provide a uniform distribution of C1 codewords from the same sub data set in the interleaving table. U.S. Pat. No. 6,282,039B1 similarly discloses a system for uniform distribution of codewords from two-dimensionally coded data in a tape storage system.

The capacity and performance of tape storage systems using such multitrack drives have increased considerably in recent years, but there is still a need to improve efficiency. In existing techniques to improve tape-cartridge capacity, tape media have been made thinner and track widths and recorded bit-lengths have been reduced to increase data storage density. Our co-pending U.S. patent application Ser. No. 12/353,106, filed Jan. 13, 2009, describes a tape storage system in which the servo band width on tape is reduced and $2^n+1$ tracks are recorded simultaneously. However, while increased capacity is important, high read-back reliability is also paramount and thus an improved system would be desired.

SUMMARY OF THE INVENTION

According to one aspect of the present invention, a computer-implemented method is provided for writing data on a multitrack tape in a tape drive. The method includes: partitioning the data into $m(2^n+k)$ data blocks, where each data block has a logical array of rows and columns of data bytes; error-correction coding a first row and a first column of the logical array of the data block to produce an encoded block; assigning the first error-correction coded row of the encoded block to a respective location in a logical interleave array having L rows and $2^n+k$ columns of locations; and writing a sequence of the first error-correction coded row and another error-correction coded row assigned to respective columns of the $2^n+k$ columns of the logical interleave array simultaneously in respective data tracks on the multitrack tape, where the step of assigning the first error-correction coded row of the encoded block to a respective location in a logical interleave array is performed such that the minimum Euclidean distance on the multitrack tape between the first error-correction coded row of the encoded block and the other error-correction coded row of the same encoded block is maximized.

According to a second aspect of the present invention, a computer-implemented method is provided for interleaving data in a tape drive having $2^n+k$ write elements and for writing data simultaneously in $2^n+k$ data tracks on a multitrack tape in said tape drive where n is a positive integer and k is an integer $\geq 0$. The method includes: receiving $m(2^n+k)$ encoded blocks of data, where m is a positive integer, and where each encoded block has a logical array of error-correction coded rows of data bytes and error-correction coded columns of data bytes; assigning a first error-correction coded row of the encoded block to a respective location in a logical interleave array having L rows and $2^n$+k columns of locations; and outputting a sequence of the first error-correction coded row and another error-correction coded row assigned to respective columns of $2^n$+k columns of the logical interleave array to respective write elements for simultaneously writing in the sequence in the $2^n$+k data tracks, where the step of assigning the error-correction coded row of the encoded block to a respective location in a logical interleave array is performed such that the minimum Euclidean distance on the multitrack tape between the first error-correction coded row of the encoded block and the other error-correction coded row of the same encoded block is maximized.

According to a third aspect of the present invention, a computer program product is provided that includes a program code means for causing a computer to perform the methods of the present invention.

According to a fourth aspect of the present invention, a computer-implemented apparatus is provided for processing data in a tape drive having $2^n$+k write elements and for writing data simultaneously in $2^n$+k data tracks on a multitrack tape in the tape drive, where n is a positive integer and k is an integer $\geq 0$. The apparatus includes: a memory unit for storing m($2^n$+ k) encoded blocks of data, where m is a positive integer, and where each encoded block has a logical array of error-correction coded rows of data bytes and error-correction coded columns of data bytes; and a control logic unit adapted to (i) assign a first error-correction coded row of the encoded block to a respective location in a logical interleave array having L rows and $2^n$+k columns of locations, (ii) supply a sequence of error-correction coded row and another error-correction coded row assigned to a respective columns of the logical interleave array for writing by respective write elements simultaneously in the $2^n$+k data tracks, and (iii) assign the error-correction coded row to the respective location of the logical interleave array such that the minimum Euclidean distance on the multitrack tape between the first error-correction coded row of the encoded block and the other error-correction coded row of the same encoded block is maximized.

According to a fifth aspect of the present invention, a computer-implemented tape drive is provided for writing data on a multitrack tape. The tape drive includes: an apparatus according to the fourth aspect of the present invention; and a write head unit having $2^n$+k write elements for writing data simultaneously in $2^n$+k data tracks on the multitrack tape. where the tape drive is adapted such that the sequence of the first error-correction coded row and another error-correction coded row assigned to respective columns of the $2^n$+k columns of the logical interleave array are written by respective write elements simultaneously in the $2^n$+k data tracks.

BRIEF DESCRIPTION OF THE DRAWINGS

FIG. 5 illustrates part of an interleave array for a second data write process according to embodiments of the present invention.

DETAIL DESCRIPTION OF PREFERRED EMBODIMENTS

According to one embodiment of the present invention, a computer-implemented method is provided for writing data on a multitrack tape in a tape drive.

The method includes: partitioning the data into m($2^n$+k) data blocks, where each data block has a logical array of rows and columns of data bytes; error-correction coding a first row and a first column of the logical array of the data block to produce an encoded block; assigning the error-correction coded row of the encoded block to a respective location in a logical interleave array having L rows and $2^n$+k columns of locations; and writing a sequence of the first error-correction coded row and another error-correction coded row assigned to respective columns of the $2^n$+k columns of the logical interleave array simultaneously in respective data tracks on the multitrack tape, where the step of assigning the first error-correction coded row of the encoded block to a respective location in a logical interleave array is performed such that the minimum Euclidean distance on the multitrack tape between the first error-correction coded row of the encoded block and the other error-correction coded row of the same encoded block is maximized.

A $2^n$+k number of data tracks (k$\geq$0) can be written simultaneously in the multitrack drives while providing exceptional readback reliability. Input data is partitioned into m($2^n$+k) data blocks, and the rows and columns of each block are EC-coded to produce an encoded block. The EC coded rows are then assigned to respective locations in a logical interleave array which has $2^n$+k columns, one for each of the $2^n$+k tracks to be written simultaneously. This assignment is performed so as to distribute EC coded rows from the same encoded block in a particular manner in the interleave array. In contrast to prior systems discussed above where such EC-coded rows (the C1 codewords) are simply distributed uniformly in the interleaving table, here the coded rows are distributed so that the minimum Euclidean distance on the tape between coded rows from the same block is maximized. This feature provides for reliable data recording with exceptional error-correction performance, offering improved efficiency and allowing high readback reliability standards to be met even where measures are employed to increase storage capacity. For example, in particularly preferred embodiments the number of simultaneously-written data tracks is increased (i.e. k>0) to provide improved servo format efficiency while maintaining high standards of reliability.

The partitioning of input data into m($2^n$+k) data blocks can be performed as a continuous process so that an input data stream is partitioned into successive sets of m($2^n$+k) blocks. In LTO drives, for example, the input data stream can be partitioned into successive data sets, each data set being partitioned into m($2^n$+k) sub data sets.

Each of the m($2^n$+k) data blocks includes a logical array of rows and columns of data bytes. These rows and columns are EC-coded in any suitable manner, for example using a two-dimensional RS product code, to produce an encoded block. The rows of the resulting m($2^n$+k) encoded blocks are then assigned as described above to respective locations in the logical interleave array which has L rows and $2^n$+k columns of locations. (In these processes and in general herein, what is considered to be a "row" and a "column" of a logical array is a matter of selection according to deemed array orientation, whereby "rows" and "columns" are effectively interchangeable herein). Each of the $2^n+k$ columns of the interleave array thus has a sequence of EC-coded rows assigned to that column. These sequences of coded rows are then written simultaneously by $2^n+k$ write elements in respective data tracks on the multitrack tape. Additional data processing can be performed at various stages in the basic process just described. For example, header information is typically included in the coded rows after EC-coding, and coded rows from different encoded blocks can be grouped into so-called "codeword objects" before or after assignment to interleave array locations. In such embodiments, therefore, the interleave assignment process can be performed on individual coded rows or on codeword objects. This will be described further below.

The maximum value for the minimum Euclidean distance on tape between coded rows from the same block depends on various system parameters such as track spacing, recorded bit-length, data block size, and so on. In general, however, methods embodied in the present invention perform the interleave assignment in such a manner as to achieve the maximum possible minimum distance value according to the particular parameters and operating constraints of a given system.

The mapping of coded rows to interleave array locations is performed in accordance with an interleave equation in which the value of a particular parameter is selected to maximize the minimum Euclidean distance discussed above. The interleave mapping is preferably performed by: assigning respective block numbers $N_b=0, 1, 2, \ldots, m(2^n+k)-1$ to the $m(2^n+k)$ encoded blocks; assigning respective row numbers $N_r=0, 1, 2, \ldots, N_2-1$ to the coded rows of each encoded block, where $N_2$ is the number of coded rows in each encoded block; and assigning each coded row of each encoded block to a location $(r, t)$ in the interleave array satisfying the equation:

$$N_b+m(2^n+k)N_r=\mod(r,m)+m(2^n+k)*\text{floor}(r/m)+m*\mod(t-p*\mod(\text{floor}(r/m),2^n+k),2^n+k),$$

where r is a row in the respective location in the logical interleave array and $r \geq 0$ and $r \leq L-1$, where t is a column in the respective location in the logical interleave array and $t \geq 0$ and $t \leq (2^n+k)-1$, and where p is a positive integer satisfying $\gcd(p, 2^n+k)=1$. (The various functions in this equation will be defined below.) In general there will be many integers p which satisfy this condition, but the value of p is selected here is one that gives the maximum value for the minimum Euclidean distance discussed above among the set of all possible values of p.

As described earlier, current LTO drives can write simultaneously to $2^n$ data tracks. The interleave algorithm just described can be applied with $k=0$ for simultaneous writing to $2^n$ tracks, but the method is also applicable when the number of simultaneously-written tracks is increased, i.e. when $k>0$. Hence, preferred embodiments of the present invention can exploit the increased efficiency offered by $k>0$ while still providing exceptional reliability via the interleave process already described. For example, since more tracks are written at the same time when n is increased and $k>0$, the servo band width can be reduced because fewer servo positions are required to define the write-positions of the head. This reduces the servo format overhead and increases overall servo format efficiency. In such embodiments, the value of k can be selected such that the space freed by reducing the servo band width is used for writing the additional tracks. Moreover, reducing the servo band width as permitted leads to further improvements in system performance, such as track-following and longitudinal position estimation as will be explained further below.

In this embodiment of the present invention, a computer-implemented method is also be provided for interleaving data in a tape drive having $2^n+k$ write elements and for writing data simultaneously in $2^n+k$ data tracks on a multitrack tape in said tape drive where n is a positive integer and k is an integer $\geq 0$. The method includes: receiving $m(2^n+k)$ encoded blocks of data, where m is a positive integer, and where each encoded block has a logical array of error-correction coded rows of data bytes and error-correction coded columns of data bytes; assigning a first error-correction coded row of the encoded block to a respective location in a logical interleave array having L rows and $2^n+k$ columns of locations; and outputting a sequence of the first error-correction coded row and another error-correction coded row assigned to respective columns of $2^n+k$ columns of the logical interleave array to respective write elements for simultaneously writing in the sequence in the $2^n+k$ data tracks, where the step of assigning the error-correction coded row of the encoded block to a respective location in a logical interleave array is performed such that the minimum Euclidean distance on the multitrack tape between the first error-correction coded row of the encoded block and the other error-correction coded row of the same encoded block is maximized.

According to another embodiment of the present invention, a computer program product is provided that includes a program code means for causing a computer to perform the methods of the present invention. It will be understood that the term "computer" is used in the most general sense and includes a device, component or system having a data processing capability for implementing a computer program. Moreover, a computer program embodying the present invention can constitute an independent program or can be an element of a larger program, and can be supplied, for example, embodied in a computer-readable medium such as a disk or an electronic transmission for loading in a computer. The program code means of the computer program can include an expression, in a language, code or notation, of a set of instructions capable of causing a computer to perform the methods, either directly or after either or both of (a) conversion to another language, code or notation, and (b) reproduction in a different material form.

According to still another embodiment of the present invention, a computer-implemented apparatus is provided for processing data in a tape drive having $2^n+k$ write elements and for writing data simultaneously in $2^n+k$ data tracks on a multitrack tape in the tape drive, where n is a positive integer and k is an integer $\geq 0$. The apparatus includes: a memory unit for storing $m(2^n+k)$ encoded blocks of data, where m is a positive integer, and where each encoded block has a logical array of error-correction coded rows of data bytes and error-correction coded columns of data bytes; and a control logic unit adapted to (i) assign a first error-correction coded row of the encoded block to a respective location in a logical interleave array having L rows and $2^n+k$ columns of locations, (ii) supply a sequence of error-correction coded row and another error-correction coded row assigned to a respective columns of the logical interleave array for writing by respective write elements simultaneously in the $2^n+k$ data tracks, and (iii) assign the error-correction coded row to the respective location of the logical interleave array such that the minimum Euclidean distance on the multitrack tape between the first error-correction coded row of the encoded block and the other error-correction coded row of the same encoded block is maximized.

According to yet another embodiment of the present invention, a computer-implemented tape drive is provided for writing data on a multitrack tape. The tape drive includes: a computer-implemented apparatus for processing data in a tape driving having $2^n+k$ write elements and for writing data simultaneously in $2^n+k$ data tracks on a multitrack tape in the tape drive (as described above); and a write head unit having $2^n+k$ write elements for writing data simultaneously in $2^n+k$ data tracks on the multitrack tape, where the tape drive is adapted such that the sequence of the first error-correction coded row and another error-correction coded row assigned to respective columns of the $2^n+k$ columns of the logical interleave array are written by respective write elements simultaneously in the $2^n+k$ data tracks.

Figure 1:
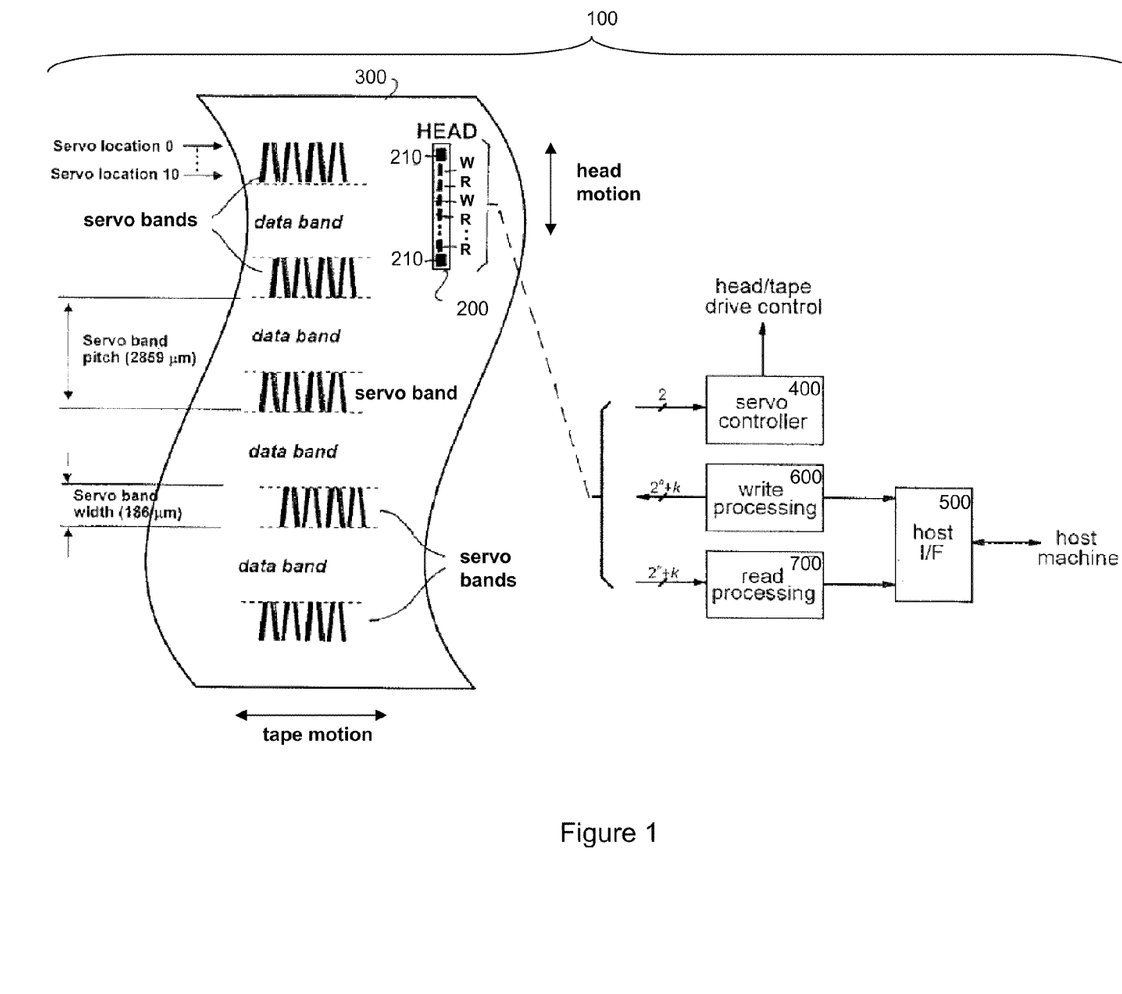
FIG. 1 is a schematic representation of a multitrack tape drive according to embodiments of the present invention.

Referring to FIG. 1, a schematic representation of a multitrack tape drive 100 is provided. The drive 100 is LTO compliant, having a multi-element read/write head, an example of which is shown in simplified form at block 200. The head 200 is operable to read and write data simultaneously in multiple parallel data tracks extending longitudinally within the magnetic tape 300. The tape 300 can be driven longitudinally in either direction by a reel-to-reel drive mechanism (not shown), while the head 200 can be moved in the transversal tape direction by a head positioning mechanism (not shown). The data tracks on tape 300 are arranged in four data bands that are spaced laterally across the tape 300 as illustrated. These alternate with five servo bands that contain the TBS servo patterns described earlier. The head 200 is shown here in simplified form as having two servo readers 210, one at each end of a linear array of alternating read and write elements.

Specifically, $2^n+k$ write elements (W) are arranged alternately with $2^n+k$ read elements R. In general, n is a positive integer and k is an integer $\geq 0$, but the particular values of n and k can be selected as desired for a given system. Thus, the head 200 can simultaneously write or read data in $2^n+k$ data tracks. In practice, the head 200 in LTO drives can have two component modules, each like the head 200 just described and arranged side by side with the read and write elements positioned in anti-phase on the two modules. This allows data written by the write elements of one module to be read simultaneously by the read elements of the other module for verification purposes. In other LTO drives, the read and write elements can be arranged on top of each other ("piggybacked") rather than alternately on the head. The key operating features can be understood by considering the simple head structure illustrated.

When reading/writing to tracks in a given data band, the servo patterns in the adjacent servo bands are read by respective servo readers 210 on the head 200. The signals from these servo sensors are sent to a servo controller 400 that generates control signals to control the tape transport and head drive mechanisms to maintain correct alignment of the head 200 with the active data tracks. Within each servo band, multiple servo positions are defined at different lateral positions across the band. Here, in FIG. 1, 11 servo positions are shown. Through the operation of the servo system, the head 200 can be positioned with the servo sensors 210 aligned with each of these 11 positions in their respective servo bands. In each servo position, the head 200 can read/write data in a different subset of $2^n+k$ tracks in the data band.

Drive 1 also includes a host interface 500, a write processing apparatus 600 and a read processing apparatus 700. Data to be written to the tape 300 is received from a host machine by the host interface 500 and processed by the write processing apparatus 600 as described in more detail below. The write circuitry outputs $2^n+k$ parallel data channels to respective write elements W of the head 200. Similarly, readback data is supplied by the read elements R on $2^n+k$ parallel data channels for processing by the read processing apparatus 700. The processed data is then supplied via the host interface 500 to the host machine.

Figure 2:
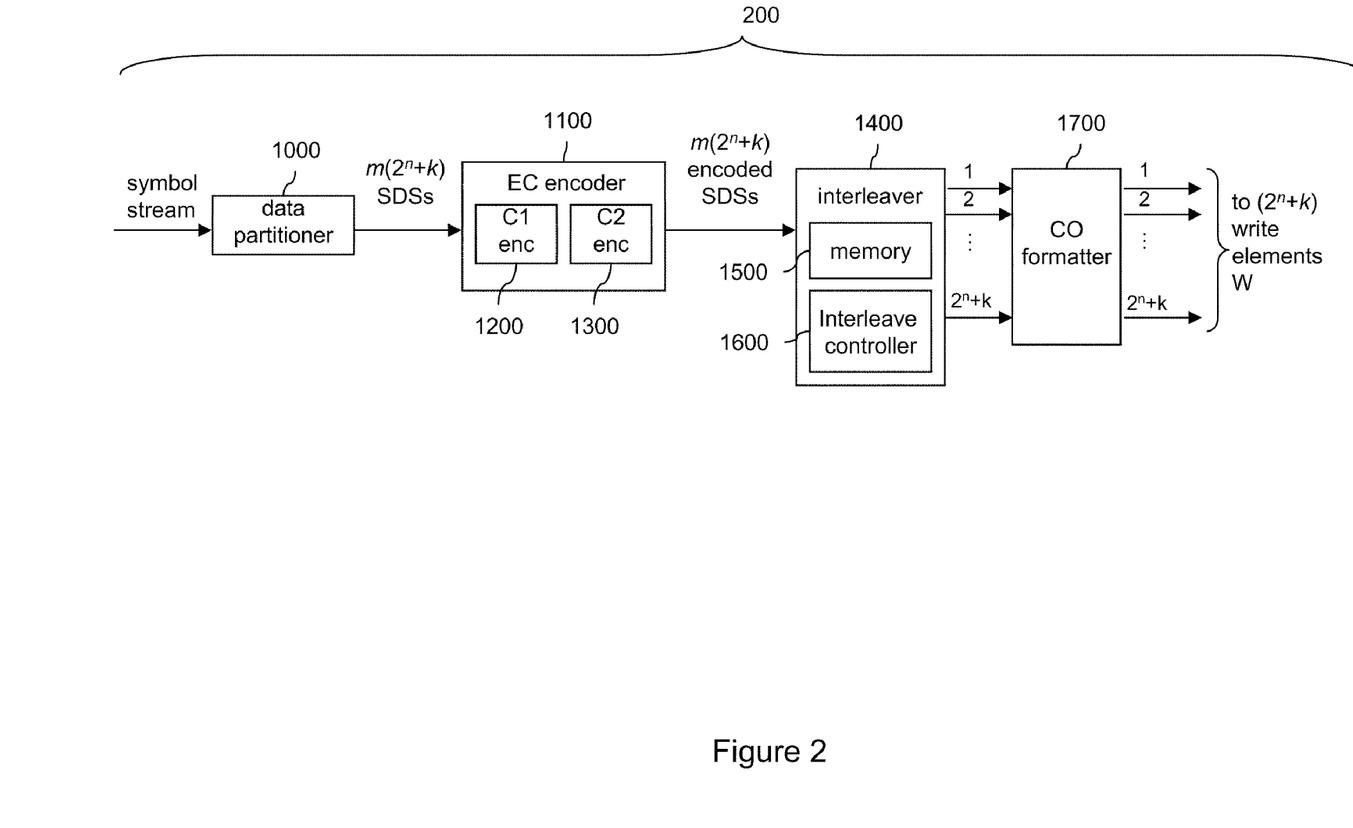
FIG. 2 is a schematic block diagram of a write processing apparatus in the multitrack tape drive shown in FIG. 1.

Referring to FIG. 2, a simplified block diagram of the write processing apparatus 600 shows the main components involved in the operation of the preferred embodiments to be described. The apparatus 500 includes a data partitioner 1000, and an EC encoder 1100 including a C1 encoder 1200 and a C2 encoder 1300, which are used together for implementing a two-dimensional EC coding process described further below. EC encoder 1100 is connected to a data interleaver 1400 having memory 1500 for storing the data elements to be interleaved and a control logic represented by the interleave controller 1600 for controlling the interleave process as detailed below. In general, the interleave control logic can be implemented in hardware or software or a combination thereof. In the present embodiment, however, it is assumed that the control logic is implemented by software which configures a processor to perform the functions described. Suitable software will be apparent to those skilled in the art from the description herein. Interleaver 1500 outputs the interleaved data on $2^n+k$ parallel data channels to a codeword object (CO) formatter 1700 that formats the data on each channel as described further below. The resulting $2^n+k$ parallel channels of the formatted data will be supplied, after some additional processing, to respective write elements W on the head 200 to be written simultaneously in the $2^n+k$ active data tracks.

Figure 3A:
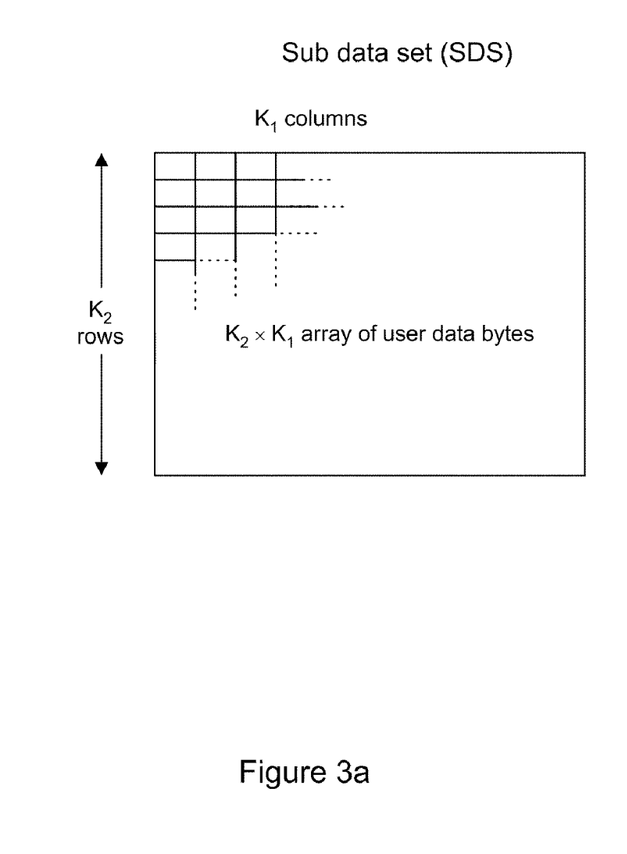
FIGS. 3a and 3b illustrate the logical array structure of data blocks before and after EC coding in the write processing apparatus shown in FIG. 2.

In operating the write processing apparatus 600, the data partitioner 1000 receives a stream of data symbols obtained from the input host data record after various preliminary processing stages such as addition of CRC (cyclic redundancy check) bytes, data compression, data encryption, and addition of file mark and control symbols. The data partitioner 1000 partitions this input data stream into successive data sets. Each data set includes $m(2^n+k)$ data blocks, or sub data sets, where m is a positive integer whose value can be selected as desired in a given system. Each of the $m(2^n+k)$ sub data sets has $K_1 * K_2$ data bytes corresponding to the logical array structure illustrated in FIG. 3a. In this figure, the sub data set (SDS) is illustrated as an array of $K_1$ columns and $K_2$ rows of data bytes.

Figure 3B:
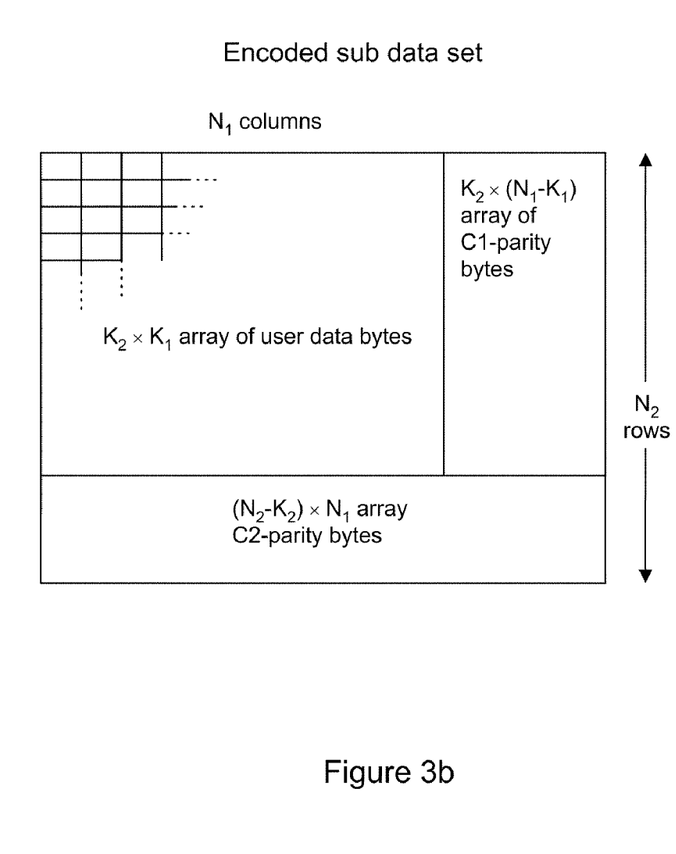

The sub data sets output by the data partitioner 1000 are supplied to the EC encoder 1100 where each SDS is encoded with a two-dimensional Reed-Solomon (RS) product code. Specifically, error correction coding is performed over each row of the SDS array by the C1 encoder 1200. This adds $(N_1 - K_1)$ parity check bytes at the end of each row of the SDS. Similarly, error correction coding is performed over each column of the SDS array by the C2 encoder 1300 which adds $(N_2 - K_2)$ parity check bytes at the end of each column. The resulting encoded SDS thus corresponds to a logical array of $N_1 * N_2$ bytes as illustrated in FIG. 3b. The rows and columns of the encoded SDS array will be referred to hereinafter as C1 codewords and C2 codewords respectively. (Note that, in practice, a C1 codeword is often obtained by symbol-level interleaving of several RS codewords to increase the robustness of the read signals to burst errors along a track. For example, existing LTO drives typically use two-way byte-level interleaving. This does not, however, affect operation of the interleaving process to be described).

The encoded sub data sets are supplied by the EC encoder 1100 to the interleaver 1400 which controls the interleaving of data to be written in the $2^n+k$ active data tracks. This is done by assigning the C1 codewords of the $m(2^n+k)$ encoded sub data sets to respective locations in a logical interleave array having L rows and $2^n+k$ columns of locations. The mapping of C1 codewords to interleave array locations is performed by the interleave controller 1600. The interleave controller 1600 appends headers to the rows (C1 codewords) of each encoded SDS to form an extended encoded sub data set (ESDS). The header for a C1 codeword indicates the position of the codeword in the data set. The interleave controller 1600 then assigns the C1 codewords (with added headers) to respective locations in the aforementioned interleave array in accordance with an interleaving system detailed below. Each C1 codeword is stored at a location in the memory 1500 corresponding to its assigned location in the interleave array. When all C1 codewords in the data set have been stored in the memory 1500, the interleave controller 1600 controls the memory readout operation to output the codewords on $2^n+k$ parallel data outputs of the interleaver 1400.

Specifically, the sequence of C1 codewords assigned to each of the $2^n+k$ columns of the interleave array is supplied to a respective output of the interleaver. The codeword sequences on the $2^n+k$ parallel outputs will ultimately be supplied to respective write elements W on the tape head 200 and will thus be written simultaneously in respective data tracks on the tape. Before this, however, the codeword sequences are supplied to the CO formatter 1700. For each sequence, the formatter 1700 assigns each successive pair of adjacent C1 codewords to a codeword object (CO). The formatter ensures here that the codewords of a given sub data set are either all in the first half or all in the second half of the COs. The resulting $2^n+k$ CO sequences are then supplied on respective outputs of the formatter 1700 to various further processing stages (not shown). For example, COs are randomized and modulation encoded, and various synchronization patterns are inserted, to obtain synchronized codeword objects (SCOs). The SCOs are then write equalized, and the resulting $2^n+k$ sequences of the processed SCOs are written simultaneously in the $2^n+k$ active data tracks on the tape 300. Note that randomization modulation encoding and insertion of various synchronization patterns are per-track formatting functions that generate NRZI (non-return to zero inverted) channel bits in LTO; these NRZI bits are write-equalized before being recording on tape.

Based on the processing described above, each data set generates a total of $m*(2^n+k)*N_2$ ESDS rows, or "ESDSRs", where each ESDSR contains N1 coded bytes (the C1 codeword) plus H header bytes. In LTO-1 (as defined in the ECMA-319 standard), for example, H=10 bytes are reserved for each sub data set row that has a length of $N_1=480$ coded bytes.

The operations performed by the read processing apparatus 700 on data readback are generally the reverse of the write processing operations described above and need not be described in detail here. Note however that, while C1 coding is described as being performed prior to C2 coding in the write processing apparatus 600, these coding stages can be performed in either order. The corresponding C1 and C2 decoding stages can be performed in either order on readback regardless of the order of C1 and C2 coding although performing C2 decoding last is preferred for efficiency reasons.

The interleaving process performed by the interleaver 1400 will now be described in more detail. For each data set, interleave controller 1600 assigns respective block numbers $N_b=0, 1, 2, \ldots, m*(2^n+k)-1$ to the $m*(2^n+k)$ encoded SDSs in that data set. In addition, the interleave controller 1600 assigns a respective row number $N_r=0, 1, 2, \ldots, N_2-1$ to each ESDSR(C1 codeword plus H-byte header) in each SDS. Thus, each ESDSR in the data set can be uniquely identified by $(N_b, N_r)$ where $N_b$ and $N_r$ are the block and row numbers for that ESDSR. In the present embodiment, the interleave controller 1600 assigns a number $N_{ESDSR}$ to each ESDSR via the one-to-one mapping $N_{ESDSR}=N_b+m*(2n+k)*N_r$, where $0 \leq N_{ESDSR} \leq m*(2^n+k))*N_2-1$.

As already described, interleave controller 1600 assigns all ESDSRs in the data set to respective locations in the interleave array. This array has L rows and $(2^n+k)$ columns. The columns correspond to the respective $(2^n+k)$ concurrently-active data tracks to which the data is to be written, and each row is associated with a particular set of $(2^n+k)$ ESDSRs that will be recorded simultaneously. The interleave array can thus "contain" $L*(2^n+k)$ ESDSRs and hence $L*(2^n+k)*(N_1+H)$ coded bytes. Since the interleave array can contain exactly one data set, the total number of coded bytes in the interleaving array is also equal to $(N_1+H)*N_2*m*(2^n+k)$ as each extended SDS contains $(N1+H)*N2$ bytes and there are $m*(2^n+k)$ extended SDSs in a data set. Consequently, the number of rows in the interleaving array is a multiple of $N_2$, and specifically $L=m*N_2$. Finally, in this preferred embodiment, the number of rows in the interleaving array is a multiple of the total number of parallel channels, i.e. $L=j*(2^n+k)$ where j is a positive integer. This ensures that the ESDSRs in an extended sub data set are evenly distributed across a data set on tape, i.e. across the $L*(2^n+k)$-location interleaving array. This can readily be achieved by selecting the C2 codeword length $N_2$ such that it is a multiple of $(2^n+k)$.

The interleave controller 1600 assigns each ESDSR in the data set to a location (r, t) in the interleave array satisfying equation 1:

$$N_{ESDSR}=N_{b+m}(2^n+k)N_r=\mathrm{mod}(r,m)+m(2^n+k)*\mathrm{floor}(r/m)+m*\mathrm{mod}(t-p*\mathrm{mod}(\mathrm{floor}(r/m),2^n+k),2^n+k)$$

where:

floor(x) denotes the integer part of the real number x;

mod(y, z) denotes the modulo operation on value y modulus;

$0 \leq r \leq L-1$ defines the row of the interleave array;

$0 \leq t \leq (2^n+k)-1$ defines the column of the interleave array; and p is a positive integer satisfying $\gcd(p, 2^n+k)=1$, where gcd denotes greatest common divisor.

As explained above, each row r of the interleave array is associated with a particular set of $(2^n+k)$ ESDSRs that will be recorded simultaneously. In the following, therefore, a row can also be described as an ESDSR set, with r representing the ESDSR set number. The column number t of the interleave array corresponds to a particular logical track number among the $2^n+k$ currently active tracks. This requirement, in conjunction with the assumption of $L=j*(2^n+k)$, ensures that all ESDSRs in a sub data set are evenly distributed across the interleave array in order to maximize the number of dead tracks that the Reed-Solomon product code can correct. In practice, there are many integers p that could satisfy the condition $\gcd(p, 2^n+k)=1$. However, the value of p is selected here such that, when the ESDSRs of the data set have been assigned to their interleave array locations (r, t) and written to the tape as described above, the minimum Euclidean distance on the tape between ESDSRs from the same SDS is maximized.

For each ESDSR received by the interleaver 1400 and assigned an identifier $N_{ESDSR}$, the interleave controller 1600 calculates the appropriate column t in the interleave array, i.e. the logical track number, in accordance with equation 2:

$$t=\mathrm{mod}(p*\mathrm{floor}(N_{ESDSR}/(m*(2^n+k)))+\mathrm{floor}(N_{ESDSR}/m), 2^n+k)$$

Similarly, the appropriate row r in the interleave array is calculated in accordance with equation 3:

$$r = m^* \text{floor}(N_{ESDSR}/(m^*(2^n+k))) + \text{mod}(N_{ESDSR}, m)$$

The resulting location (r, t) for the ESDSR satisfies equation (1) above which expresses the inverse mapping.

By assigning ESDSRs to interleave array locations so as to maximize the minimum distance on the tape between ESDSRs from the same SDS, the error correction capability of the tape drive is significantly improved as is the robustness of the data recording system against disturbances such as large defects on tape. For example, the robustness of the system against two-dimensional burst errors can be significantly increased. The appropriate value of the parameter p used in the interleave controller 1600 to maximize this minimum distance will of course depend on a variety of system parameters. The relevant lengths for computing the minimum Euclidean distance between ESDSRs on tape are the unit length in longitudinal direction and the unit length in the lateral direction. The unit length in longitudinal direction is the length of an ESDSR, i.e. half of the SCO length. (This is so even though CO-formatting is employed because COs are defined such that the ESDSRs in a CO cannot belong to the same sub data set). The relevant unit length in lateral direction is the channel spacing. The uniform-distribution approach of the current LTO standard leads to a minimum distance between ESDSRs on the tape of about 1 mm. This can be computed using the expression $\text{sqrt}(0.64^2+(5^*0.1665-0.0115)^2)$ mm where the SCO length, the channel spacing and the track pitch are 0.64 mm, 0.1665 mm and 0.0115 mm respectively, and sqrt denotes the square root operation.

Analysis shows that this is considerably less than the maximum achievable minimum Euclidean distance for the system in question. In particular, an equivalent embodiment of the present invention can achieve a 50% increase in the minimum Euclidean distance.

In certain preferred embodiments, the above system can be applied with k>0, so that more than $2^n$ tracks are written concurrently while still providing exceptional reliability. As the number of data tracks that are simultaneously addressed increases, the width of the servo information necessary to locate read and write elements decreases because every servo location is then associated with more data tracks than before. Therefore, the servo band width can be reduced and this in turn allows the placement of k additional data tracks in areas of the tape that used to be servo area. The integer k here is typically much smaller than $2^n$. Two exemplary interleaving processes for implementation in interleaver 14 when k=1 will be described in the following.

The main system parameters for the first example are n=5, k=1, m=2, j=6 and p=16. In this case there are $2^n+k=33$ parallel channels. Note that $\gcd(p, 2^n+k)=\gcd(16,33)=1$. Furthermore, there are $m^*(2^n+k)=66$ sub data sets in a data set and the interleaving array has $L=j^*(2^n+k)=198$ rows and $2^n+k=33$ columns. Therefore, there is a total of $198^*33=6534$ ESDSRs in the interleaving array.

The C2 code has a codeword length of $N_2=L/m=99$ bytes. It is also assumed that the dimension of the C2 code is $K_2=87$ bytes and the C1 codewords are 4-way interleaved 240-byte codewords that are obtained using a Reed-Solomon code with a dimension of 230 bytes and a codeword length of 240 bytes. Therefore, $N_1=960$ bytes and $K_1=920$ bytes.

A data set contains 99 SCOs per track because an SCO contains 2 ESDSRs. Therefore, the length of the data set on tape is $99^*1.2$ mm=118.8 mm assuming an SCO length of 1.2 mm. In this case the interleaving equations are:

$$N_{ESDSR} = N_b + 66^*N_r$$

$$t = \text{mod}(16^*\text{floor}(N_{ESDSR}/66) + \text{floor}(N_{ESDSR}/2), 33)$$

$$r = 2^*\text{floor}(N_{ESDSR}/66) + \text{mod}(N_{ESDSR}, 2)$$

The inverse interleaving mapping in this case is:

$$N_{ESDSR} = \text{mod}(r,2) + 66^*\text{floor}(r/2) + 2^*\text{mod}(t-16^*\text{mod}(\text{floor}(r/2),33),33)$$

Figure 4:
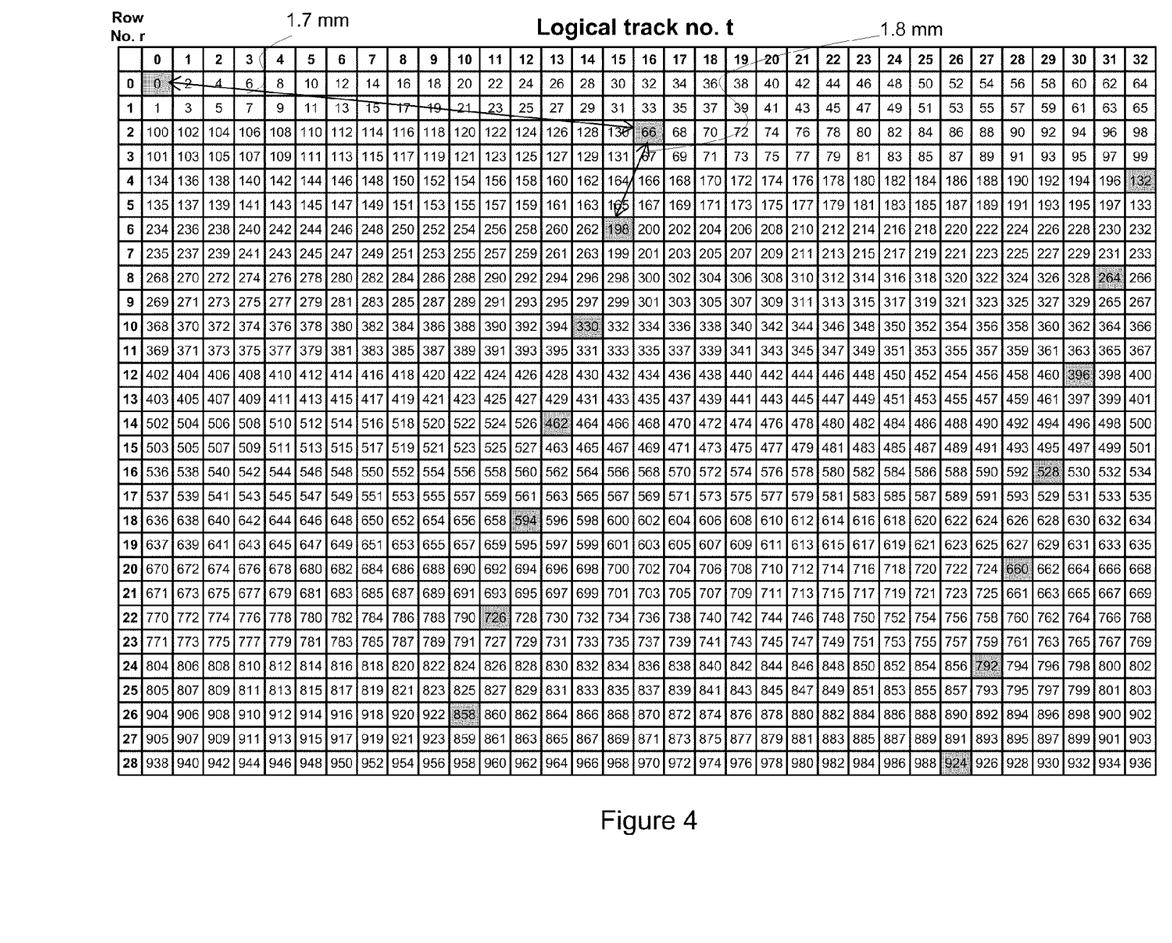
FIG. 4 illustrates part of an interleave array for a first data write process according to embodiments of the present invention.

The result of the mapping from ESDRs to interleave array locations can be represented in a 198×33 interleaving table. The initial portion of this table is shown in FIG. 4, although the entire 198-row table can of course be derived from the equations above. In this figure, the row numbers correspond to the ESDSR set number r and the column numbers correspond to the logical track number t. The numbers inside the boxes at the intersection of column t, $0 \leq t \leq 32$, and row r, $0 \leq r \leq 197$, correspond to the number $N_{ESDSR}$. The shaded boxes in the figure correspond to the ESDSRs for $N_b=0$. It can readily be seen that the ESDSRs in an extended SDS are evenly distributed across the interleaving table. However, the dimensions in this table do not represent the spacing of ESDSRs actually recorded on the tape. This is demonstrated by the two labelled arrows in the figure which indicate the true distances on tape. In particular, the minimum distance between SDS rows on tape is computed by assuming that the SCO length, the channel spacing and the track pitch are 1.2 mm, 100 μm and 5 μm respectively. Therefore, the columns in FIG. 4 are assumed to have a width of 5 μm, whereas the rows are assumed to have a width of 1.2/2 mm=0.6 mm. Furthermore, the center lines of the columns, which represent the recorded tracks, are separated by 100 μm. Although the columns (recorded tracks) are shown adjacent to each other in FIG. 4, they are separated by 100 μm−5 μm=95 μm on the tape. Note that the rows in FIG. 4 are actually adjacent to each other on the tape. It can be seen from this figure that the Euclidean distance between $N_{ESDSR}=0$ and $N_{ESDSR}=66$ is $\text{sqrt}((1^*1.2/2)2+(16^*0.1-0.005)2)$ mm=1.7 mm whereas the Euclidean distance between $N_{ESDSR}=66$ and $N_{ESDSR}=198$ is $\text{sqrt}((3^*1.2/2)2+(1^*0.1-0.005)2)$ mm=1.8 mm.

Therefore, the minimum Euclidean distance between SDS rows on the tape is 1.7 mm. Note that, in this example, selecting p=17 could also result in the same minimum distance of 1.7 mm between ESDSRs on the tape. However, p=16 is the preferred choice here because multiplication by 16 in binary arithmetic corresponds to a shift and is therefore very simple to implement.

The C2 Reed-Solomon code with parameters $N_2=99$ bytes and $K_2=87$ bytes has a Hamming distance of 13. For the computation of the byte error rate at the C2 decoder output, it is assumed that the byte erasure rate at the input of the C2 decoder is $1.8^*10^{-3}$ and the erasure margin is 1 symbol. In this case, the byte error rate at the output of the C2 decoder is computed to be about $10^{-17}$. Therefore, the proposed scheme satisfies the requirement of one erroneous byte in $10^{17}$ read bytes. An operating point corresponding to a byte erasure rate of $1.8^*10^{-3}$ can be achieved by the C1 decoder that has the capability of correcting up to 5 bytes in a 240-byte codeword provided that the channel conditions are not poor. In a poor channel condition, the linear tape technology makes use of a rewriting technique that is well known in the art.

The main system parameters for the second example are n=5, k=1, m=1, j=2 and p=10. In this case there are $2^n+k=33$ parallel channels. Note that $\gcd(p, 2^n+k)=\gcd(10,33)=1$. Furthermore, there are $m^*(2^n+k)=33$ sub data sets in a data set and the interleaving array has $L=j^*(2^n+k)=66$ rows and $2^n+k=33$ columns. Therefore, there is a total of $66^*33=2178$ ESDSRs in the interleaving array. The C2 code has a codeword length of $N_2=L/m=66$ bytes. It is also assumed that the dimension of the C2 code is $K_2=56$ bytes and the C1 codewords are 4-way interleaved 240-byte codewords obtained using a Reed-Solomon code with a dimension of 230 bytes and a codeword length of 240 bytes. Therefore, $N_1=960$ bytes and $K_1=920$ bytes. Finally, a data set contains 33 SCOs per track because an SCO contains 2 ESDSRs. Therefore, the length of the data set on tape is 33*1.2 mm=39.6 mm assuming an SCO length of 1.2 mm. In this example the data set size is three times smaller than in the first example, reducing the size of the memory required for storing a data set by a factor of three. The interleaving equations in this example are:

$$N_{ESDSR}=N_b+33*N_r$$

$$t=\mod(10*\text{floor}(N_{ESDSR}/33)+\text{floor}(N_{ESDSR}),33)$$

$$r=\text{floor}(N_{ESDSR}/33)$$

The inverse interleaving mapping in this case is:

$$N_{ESDSR}=33*\text{floor}(r)+\mod(t-10*\mod(\text{floor}(r),33),33)$$

The result of the mapping from ESDRs to interleave array locations can be represented in a 66×33 interleaving table. The initial portion of this table is shown in FIG. 5, although the entire 66-row table can again be derived from the above equations. As before, the row numbers correspond to ESDSR set number r, the column numbers to logical track number t, and the numbers inside the boxes correspond to the number $N_{ESDSR}$. The shaded boxes correspond to the ESDSRs for $N_b=0$, and again these are evenly distributed across the table. Once again, however, it is emphasized that dimensions in the table do not represent dimensions on the tape as is demonstrated by the labelled arrows indicating actual distances on tape. The minimum distance between SDS rows on the tape is computed by assuming that the SCO length, the channel spacing and the track pitch are 1.2 mm, 100 μm and 5 μm respectively. Therefore, the columns in FIG. 5 are assumed to have a width of 5 μm and the rows a width of 1.2/2 mm=0.6 mm.

Like the above example, the center lines of the columns, which represent the recorded tracks, are separated by 100 μm and the columns are separated by 100 μm−5 μm=95 μm on the tape. The rows in FIG. 5 are adjacent to each other on the tape. It can be seen from this figure that the Euclidean distance between $N_{ESDSR}=0$ and $N_{ESDSR}=33$ is sqrt((0*1.2/2)2+(10*0.1−0.005)2) mm=0.995 mm whereas the Euclidean distance between $N_{ESDSR}=66$ and $N_{ESDSR}=132$ is sqrt((1*1.2/2)2+(13*0.1−0.005)2) mm=1.427 mm. Furthermore, the Euclidean distance between $N_{ESDSR}=33$ and $N_{ESDSR}=132$ is sqrt((2*1.2/2)2+(3*0.1−0.005)2) mm=1.235 mm. Clearly, the minimum Euclidean distance between SDS rows on the tape is 0.995 mm. The selection of p=10 leads in this case to the best possible minimum distance.

The C2 Reed-Solomon code with parameters $N_2=66$ bytes and $K_2=56$ bytes has a Hamming distance of 11. For the computation of the byte error rate at the C2 decoder output, it is assumed that the byte erasure rate at the input of the C2 decoder is $1.2*10^{-3}$ and the erasure margin is 1 symbol. In this case, the byte error rate at the output of the C2 decoder is computed to be about $10^{-17}$, satisfying the requirement of one erroneous byte in $10^{17}$ read bytes. An operating point corresponding to a byte erasure rate of $1.2*10^{-3}$ can be achieved by the C1 decoder, which has the capability of correcting up to 5 bytes in a 240-byte codeword, provided that the channel conditions are not poor, in which case the known rewriting technique can be employed as above.

The above examples provide highly efficient systems for the reliable recording of more than the usual $2^n$ parallel data tracks such that they can simultaneously be read in a manner that is robust to disturbances. Moreover, servo band width can be reduced, thus improving servo format efficiency. In addition, a decrease in the servo band width allows a decrease of the servo frame length (one period of the servo pattern) to a value which is less than current LTO standard length of 200 μm. The benefit of this is twofold.

First, this increases the rate at which the position error signal is generated which is important for increasing the closed-loop bandwidth for the track-following servo and thus tracking higher-frequency components of the lateral tape motion. Consequently, a higher track-following servo bandwidth leads to a better system performance in terms of standard deviation of the position error signal, hence permitting a higher track density which can be exploited without reliability issues because of the interleave system already described. It also increases the phase margin of the track-following loop, thus allowing a lower minimum tape speed for matching the tape speed to the host rate.

Second, a reduced servo frame length translates into a smaller granularity for determining the tape longitudinal position which is encoded into servo frames, and thus leads to a more accurate determination of longitudinal position.

While the preferred embodiments of the present invention are described in detail above, it will be appreciated by those skilled in the art that many changes and modifications can be made to the exemplary embodiments described. For example, the order of the interleaver 1400 and the CO formatter 1700 can be reversed in some embodiments. In general, therefore, the interleave assignment process can be performed on individual coded rows or on groups of coded rows (COs). In addition, while an LTO-compliant tape drive 100 has been described here, the invention can of course be applied in other tape drives and appropriate modifications will be apparent to those skilled in the art. Many other changes and modifications can be made to the embodiments described without departing from the scope of the invention.

What is claimed is:

1. A computer-implemented method for writing data on multitrack tape in a tape drive, said method comprising:

partitioning said data into $m(2^n+k)$ data blocks, wherein each data block has a logical array of rows and columns of data bytes and wherein m and n are positive integers and k is initially an integer f 0;

error-correction coding a first row and a first column of said logical array of said data block to produce an encoded block;

assigning said first error-correction coded row of said encoded block to a respective location in a logical interleave array having L rows and $2^n+k$ columns of locations;

writing a sequence of said first error-correction coded row and another error-correction coded row assigned to respective columns of said $2^n+k$ columns of said logical interleave array simultaneously in respective data tracks on said multitrack tape;

assigning a respective block number ($N_b$) to a $m(2^n+k)$ number of said encoded blocks, wherein $N_b=0, 1, 2, \ldots, m(2^n+k)-1$; and assigning a respective row number ($N_r$) to said first error-correction coded row of said encoded block, wherein $N_r=0, 1, 2, \ldots, N_2-1$ and wherein $N_2$ is the number of all error-correction coded rows in said encoded block, wherein the step of assigning said first error-correction coded row of said encoded block to a respective location in a logical interleave array is performed such that:
(i) the minimum Euclidean distance on said multitrack tape between said first error-correction coded row of said encoded block and said another error-correction coded row of said encoded block is maximized, and
(ii) the following equation $N_b+m(2^n+k)N_r=\mathrm{mod}(r,m)+m(2^n+k)*\mathrm{floor}(r/m)+m*\mathrm{mod}(t-p*\mathrm{mod}(\mathrm{floor}(r/m), 2^n+k), 2^n+k)$ is satisfied, wherein r is a row in said respective location in said logical interleave array and $r \geq 0$ and $r \leq L-1$, wherein t is a column in said respective location in said logical interleave array and $t \geq 0$ and $t \leq (2^n+k)-1$, and wherein p is a positive integer satisfying $\gcd(p, 2^n+k)=1$, wherein the value of p is selected to maximize said minimum Euclidean distance.

2. The method according to claim 1 further comprising partitioning an input data stream of said data block into successive sets of $m(2^n+k)$ sub data blocks.

3. The method according to claim 1 wherein k is changed to a number greater than 0.

4. The method according to claim 1 wherein $L=j(2^n+k)$ and wherein j is a positive integer.

5. The method according to claim 4 wherein n=5, k=1, m=2, j=6 and p is changed to 16.

6. The method according to claim 4 wherein n=5, k=1, m=1, j=2 and p is changed to 10.

7. A computer program product comprising program code means for causing a computer to perform the steps of the method of claim 1.

8. A computer-implemented apparatus for processing data in a tape drive having $2^n+k$ write elements and for writing data simultaneously in $2^n+k$ data tracks on a multitrack tape in said tape drive, wherein n is a positive integer and k is an integer f 0, said apparatus comprising:
a memory unit for storing $m(2^n+k)$ encoded blocks of data, wherein m is a positive integer and wherein each encoded block has a logical array of error-correction coded rows of data bytes and error-correction coded columns of data bytes; and
a control logic unit adapted to:
(i) assign a first error-correction coded row of said encoded block to a respective location in a logical interleave array having L rows and $2^n+k$ columns of locations,
(ii) supply a sequence of said error-correction coded row and another error-correction coded row assigned to respective columns of said $2^n+k$ columns of said logical interleave array for writing by respective write elements simultaneously in said $2^n+k$ data tracks,
(iii) assign said error-correction coded row to said respective location of said logical interleave array such that the minimum Euclidean distance on said multitrack tape between said first error-correction coded row of said encoded block and said another error-correction coded row of said encoded block is maximized,
(iv) assign a respective block number ($N_b$) to a $m(2^n+k)$ number of said encoded blocks, wherein $N_b=0, 1, 2, \ldots, m(2^n+k)-1$,
(v) assign a respective row number ($N_r$) to said first error-correction coded row of each encoded block, wherein $N_r=0, 1, 2, \ldots, N_2-1$ and wherein $N_2$ is the number of all error-correction coded rows in said encoded block, and
(vi) assign said first error-correction coded row of said encoded block to said respective location in said logical interleave array in such a way that also satisfies the equation $N_b+m(2^n+k)N_r=\mathrm{mod}(r,m)+m(2^n+k)*\mathrm{floor}(r/m)+m*\mathrm{mod}\ t-p*\mathrm{mod}(\mathrm{floor}(r/m), 2^n+k), 2^n+k)$, wherein r is a row in said respective location in said logical interleave array and $r \geq 0$ and $r \leq L-1$, wherein t is a column in said respective location in said logical interleave array and $t \geq 0$ and $t \leq (2^n+k)-1$, and wherein p is a positive integer satisfying $\gcd(p, 2^n+k)=1$, wherein the value of p is selected to maximize said minimum Euclidean distance.

9. The apparatus according to claim 8 further comprising:
a data partitioner unit for partitioning an input data stream of said encoded block into successive sets of $m(2^n+k)$ sub data blocks, wherein each sub data block has a logical array of rows and columns of data bytes; and
an encoder unit for error-correction coding said rows and columns of said sub data block to produce said encoded sub data blocks.

10. The apparatus according to claim 8 wherein k is changed to a number greater than 0.

11. The apparatus according to claim 8 wherein $L=j(2^n+k)$, n=5, k=1, and the set of values for (m, j, p) is (2, 6, 16) or (1, 2, 10).

12. The apparatus according to claim 8, further comprising:
a write head unit having $2^n+k$ write elements for writing data simultaneously in $2^n+k$ data tracks on a multitrack tape,
wherein said sequence of said first error-correction coded row and another error-correction row assigned to respective columns of said $2^n+k$ columns of said logical interleave array are written by respective write elements simultaneously in said $2^n+k$ data tracks.

13. A computer-implemented method for interleaving data in a tape drive having $2^n+k$ write elements and for writing data simultaneously in $2^n+k$ data tracks on a multitrack tape in said tape drive, wherein n is a positive integer and k is an integer f 0, said method comprising:
receiving $m(2^n+k)$ encoded blocks of data, wherein m is a positive integer and wherein each encoded block has a logical array of error-correction coded rows of data bytes and error-correction coded columns of data bytes;
assigning a first error-correction coded row of said encoded block to a respective location in a logical interleave array having L rows and $2^n+k$ columns of locations;
outputting a sequence of said first error-correction coded row and another error-correction coded row assigned to respective columns of said $2^n+k$ columns of said logical interleave array to respective write elements for simultaneously writing in said sequence in said $2^n+k$ data tracks;
assigning a respective block number ($N_b$) to a $m(2^n+k)$ number of said encoded block, wherein $N_b=0, 1, 2, \ldots, m(2^n+k)-1$; and
assigning a respective row number ($N_r$) to said first error-correction coded row of said encoded block, wherein $N_r=0, 1, 2, \ldots, N_2-1$ and wherein $N_2$ is the number of all error-correction coded rows in said encoded block,
wherein the step of assigning said first error-correction coded row of said encoded block to a respective location in a logical interleave array is performed such that:
(i) the minimum Euclidean distance on said multitrack tape between said first error-correction coded row of said encoded block and said another error-correction coded row of said encoded block is maximized; and
(ii) the following equation $N_b+m(2^n+k)N_r=\mathrm{mod}(r,m)+m(2^n+k)*\mathrm{floor}(r/m)+m*\mathrm{mod}(t-p*\mathrm{mod}(\mathrm{floor}(r/m), 2^n+k), 2^n+k)$ is satisfied, wherein r is a row in said respective location in said logical interleave array and $r \geq 0$ and $r \leq L-1$, wherein t is a column in said respective location in said logical interleave array and $t \geqq 0$ and $t \leqq (2^n+k)-1$, and wherein p is a positive integer satisfying $\gcd(p, 2^n+k)=1$, wherein the value of p is selected to maximize said minimum Euclidean distance.

14. The method according to claim 13 wherein k is changed to a number greater than 0.

15. A computer program product comprising program code means for causing a computer to perform the steps of the method of claim 13.

* * * * *